United States Patent Office 3,350,378
Patented Oct. 31, 1967

3,350,378
1,3 BUTADIENE POLYMERS
Mieczyslaw Marcinkowski, Sarnia, Ontario, Canada, assignor to Polymer Corporation Limited, Sarnia, Ontario, Canada, a corporation
No Drawing. Filed Oct. 18, 1962, Ser. No. 231,575
Claims priority, application Canada, Nov. 25, 1961, 836,862
6 Claims. (Cl. 260—94.3)

This invention relates to the polymerization of butadiene to produce polymers in which the units are predominantly in the cis-1,4 configuration.

It is known that conjugated diolefins can be polymerized at relatively low temperatures and pressures to produce high molecular weight polymers using a catalyst formed by admixing an organo-metallic reducing agent and a reducible compound of a heavy metal. The better known such catalysts are mixtures of aluminum trialkyls with titanium tetrahalides such as titanium tetrachloride.

In the polymerization of butadiene, the monomer units may link up in cis-1,4, trans-1,4 or 1,2 configurations. It has been established that polybutadiene may be used as a replacement for natural rubber. However, for this purpose, it should be at least 80% and preferably 90% or more in the cis-1,4 configuration. It is known that when butadiene is polymerized using a catalyst system formed by admixing titanium tetraiodide with aluminum triethyl, a polymer is produced which is high in cis-1,4 content. However, such a catalyst system is expensive primarily due to the cost of iodine. On the other hand, the use of titanium tetrachloride with aluminum triethyl does not permit the production of a polymer having more than about 70% of the units in the cis-1,4 configuration.

The object of the present invention is to provide a process for producing a polymer of butadiene in which at least 80% and preferably at least 90% of the units are in the cis-1,4 configuration using TiCl$_3$I as a catalyst component.

The object of the invention is achieved in the process of producing a polymer of butadiene-1,3 in which at least 80% of the units are in the cis-1,4 configuration which comprises polymerizing butadiene in the presence of a catalyst system formed by admixing (1) TiCl$_3$I, (2) an organo-aluminum compound having a carbon atom each of at least two hydrocarbon groups attached directly to aluminum and (3) a polar hydrocarbon-soluble compound selected from the group consisting of organic hydroxyl and organic carbonyl compounds.

In one of its more specific aspects, the object of the invention is achieved in the process of producing polybutadiene in which at least 80% of the units are in the cis-1,4 configuration which comprises polymerizing butadiene in the presence of a catalyst system formed by admixing (1) TiCl$_3$I, (2) an aluminum trialkyl in which each alkyl radical contains from 2 to 6 carbon atoms and (3) a polar, hydrocarbon-soluble, compound selected from the group consisting of organic hydroxyl and organic carbonyl compounds said hydroxyl and carbonyl compounds containing 1 to 12 carbon atoms, the ratio of said organo-aluminum compound to said titanium compound being between 1.5:1 and 2.5:1 on a molar basis and the amount of said hydrocarbon-soluble compound being between 0.1 and 0.6 moles per mole of organo-aluminum compound.

The term "butadiene" as used throughout the specification and claims refers to butadiene-1,3 and is not intended to include butadiene-1,2 or the derivatives of butadiene-1,3 such as chlorobutadiene and isoprene.

The organo-aluminum compounds which are used in the catalyst system are those having a carbon atom of at least two hydrocarbon groups attached directly to aluminum. It is not necessary that the third substituent group on the aluminum be a hydrocarbon radical, although for best results it should be either a hydrocarbon radical or a halogen atom. These compounds may be represented by the general formula AlR'R"R''' in which R' and R" are hydrocarbon radicals and R''' is a halogen atom or a hydrocarbon radical. The hydrocarbon radicals may be alkyl, aryl, alkylaryl or cycloalkyl hydrocarbon radicals. Examples of such compounds are aluminum trimethyl, aluminum triethyl, aluminum triisobutyl, aluminum trihexyl, monomethyl aluminum diethyl, monoethyl aluminum dimethyl, aluminum triphenyl, aluminum diethyl monochloride, aluminum diisobutyl monobromide, and various other combinations of similar and other hydrocarbon groups. The size of the hydrocarbon groups is not critical although it is generally desirable to use those having from 1 to 12 carbon atoms and it is preferred that they have from 2 to 6 carbon atoms. The preferred organo-aluminum compounds are those in which all three substiuents are hydrocarbon radicals and of these the preferred compounds are aluminum trialkyls in which the alkyl radicals each contain from 2 to 6 carbon atoms.

The polar compounds which may be used in the catalyst system in accordance with this invention are hydrocarbon-soluble organic compounds containing one or two oxygen atoms and may be either hydroxyl or carbonyl compounds. The organic hydroxyl compounds are any of a variety of alcohols such as methyl alcohol, ethyl alcohol, isopropyl alcohol, butyl alcohol, amyl alcohol, benzyl alcohol, ethylene glycol, butane 1,4-diol, and phenols such as phenol itself, ortho cresol, meta cresol, para cresol and ethoxylated phenol. The carbonyl compounds which may be used in the practice of the invention may be represented by the general formula

in which X is a hydrocarbon radical or a heterocyclic radical containing either a nitrogen atom or an oxygen atom in a ring with carbon atoms and Y is a hydrocarbon radical, an oxyhydrocarbon radical, an OH (hydroxyl) radical or a hydrogen atom. Such carbonyl compounds include: aldehydes, such as formaldehyde, acetaldehyde, benzaldehyde and furfural; ketones such as acetone, methyl ethyl ketone, cyclohexanone, and acetophenone; carboxylic acids such as acetic acid, propionic acid, butyric acid, octoic acid, benzoic acid, nicotinic acid; and esters such as ethyl acetate and methyl benzoate. Mixtures of various hydroxyl or carbonyl compounds may be used if desired. The hydrocarbon radicals attached to the hydroxyl or carbonyl radical include aliphatic, cycloaliphatic, aryl, and alkylaryl radicals. The size of such radicals is not critical although it is limited by the requirement that the compounds must be soluble in hydrocarbons and it is generally desirable that the size is such that the organic hydroxyl and carbonyl compound contains from 1 to 12 carbon atoms and preferably from 1 to 8 carbon atoms. The preferred compounds are aliphatic alcohols and aldehydes containing 1 to 8 carbon atoms and ketones containing 3 to 12 carbon atoms.

The different components of the catalyst system may be admixed in any desired order. For example, titanium trichloromonoiodide may be reacted with the organo-aluminum compound and the reaction product treated with the polar compound. Or, the titanium halide may be mixed with the polar compound and this mixture in turn mixed with the organo-aluminum compound. On the other hand, the complex of the organo-aluminum compound with the polar compound may be formed before being admixed with the titanium halide. The latter method of forming the catalyst is preferred. The catalyst system may be prepared in the polymerization vessel if desired or it may be formed by admixing the various components in a separate vessel and then fed to the polymerization vessel together with monomeric butadiene. If the catalyst system is formed in the polymerization vessel it is desirable that the components by admixed before the addition of butadiene.

The total amount of catalyst which is required to effect polymerization may be readily determined by those skilled in the art and depends upon the particular conditions, such as temperature and the impurities present. The relative concentration of each of the components of the catalyst systems also varies somewhat with conditions such as temperature and impurities, but for the production of polymers of high cis-1,4 content in accordance with the invention must be maintained within fairly narrow limits. The molar ratio of the proportion of organo-aluminum compound to the proportion of titanium trichloromonoiodide may vary over a range from 1:1 to 3:1, but for best results should be maintained in the range from about 1.5:1 to 2.5:1.

It is most convenient to express the amount of polar compound required in the practice of the invention in terms of the amount of the organo-aluminum compound present. The quantity necessary varies, depending upon the particular compound being used, between 0.1 and 0.6 mole per mole of aluminum compound. The quantity which is preferred for best results varies from about 0.3 to 0.5 mole of polar compound per mole of aluminum compound.

The polymerization may be carried out over a wide range of temperatures ranging from about $-25°$ C. to about $+100°$ C., although temperatures outside this range can be used without departing from the scope of the invention. The reaction rate is rather slow at the lower temperatures within this range and for higher polymerization temperatures, the cis-1,4 content of the product tends to be lower. The preferred operating range is between about 0° C. and 50° C.

The reactants are preferably dispersed in a non-reactive liquid diluent. The liquids which are most useful for this purpose are aliphatic, alicyclic and aromatic hydrocarbons such as butane, pentane, hexane, heptane, cyclohexane, benzene, toluene, xylene and the like. Some halogenated liquids such as chlorobenzene and bromobenzene are also quite satisfactory while others such as carbon tetrachloride and chloroform are undesirable. Experimentation will readily distinguish between desirable and undesirable diluents. The use of aliphatic and alicyclic hydrocarbons as the sole diluent results in the production of polymers which are relatively low in cis-1,4 content, being of the order of about 80-85%. On the other hand, the use of aromatic liquids results in polymers having a cis content above 90%. Mixtures of aromatic with aliphatic and alicyclic diluents results in intermediate products. Thus, in the practice of the present invention, it is preferred to use aromatic liquids as the sole diluent or at least as the predominant component in a diluent mixture.

The invention will be described in greater detail by means of experimental results. The experiments were carried out using special grade butadiene having a purity of at least 99.4%. Unless otherwise indicated $TiCl_3I$ was added as a 0.5 molar solution in benzene and the organo-aluminum compound was added as approximately a 1 molar solution in benzene.

In the experiments the diluent was dried by azeotropic distillation. Polymerizations were carried out in standard 7-ounce crown capped bottles which had previously been thoroughly dried and flushed with nitrogen. The bottles, filled with nitrogen, were capped and the reaction components charged using a hypodermic needle inserted through a rubber gasket.

Example I

Butadiene was polymerized in the presence of a catalyst formed by admixing aluminum triisobutyl, tertiary butyl alcohol and titanium trichloromonoiodide. The ingredients were charged according to the following recipe:

| | |
|---|---|
| Benzene | 120 mls. |
| Triisobutyl aluminum | $1.07 \times 10^{-3}$ moles. |
| t-Butyl alcohol | Variable. |
| Butadiene | 30 mls. |
| $TiCl_3I$ | $0.6 \times 10^{-3}$ moles. |

The ingredients were charged in the order shown in the above recipe. After the addition of butadiene and before the addition of titanium trichloromonoiodide the bottles were capped and the contents were cooled to 0° C. After the injection of $TiCl_3I$ the bottles were placed in a water bath set at 12.8° C. and rotated end-over-end for 67 hours. Polymerization was then stopped by the injection of 10 mls. ethanol. The polymers were next recovered from benzene solution by precipitation with approximately 200 mls. of ethanolic solution of an antioxidant and dried under vacuum at 50° C. for 16 hours. The conversion was calculated from the weight of monomer charged and the weight of polymer obtained. The microstructure of the polymers was analyzed by means of an infra-red spectrophotometer. The analyses were based on the assumption that the polymer contained one unsaturated bond for each monomer unit. The structure is reported in terms of the cis-1,4 and 1,2 content, it being understood that balance of the polymer is in the trans-1,4 configuration. The results are shown in Table I.

TABLE I

| Bottle No. | Mole Ratio t-BuOH/AlR₃ | Conversion (percent) | Cis-1,4 Content (percent) | 1,2 Content (percent) |
|---|---|---|---|---|
| 1 | 0 | 60 | 61 | 3.6 |
| 2 | .15 | 99 | 81 | 2.8 |
| 3 | .30 | 71 | 80 | 3.4 |
| 4 | .45 | 85 | 88.5 | 3.3 |

The test shown by Bottle 1 is not in accordance with the invention but is included to show the necessity for the polar compound in the production of a high cis product.

Example II

Butadiene was polymerized as in Example I except that the tertiary butyl alcohol was replaced by various other alcohols. The results are shown in Table II.

TABLE II

| Alcohol | Mole Ratio ROH/AlR₃ | Conversion (percent) | Cis-1,4 Content (percent) | 1,2 Content (percent) |
|---|---|---|---|---|
| Methanol | 0.3 | 94 | 80.5 | 4.2 |
| Do | 0.45 | 39 | 90.7 | 3.1 |
| Ethanol | 0.47 | 57 | 80 | 3.5 |
| Do | 0.55 | 11 | 80 | 5.3 |
| t-Amyl alcohol | 0.30 | 100 | 88.4 | 3.6 |
| Do | 0.45 | 98 | 87.5 | 3.9 |

Example III

Butadiene was polymerized as in Example I except that t-butyl alcohol was replaced by various carbonyl compounds. The reaction time was about 24 hours after which the polymerization was stopped and the product recovered and tested as in Example I. The results are shown in Table III.

TABLE III

| Compound | Mole Ratio Additive/AlR₃ | Conversion (percent) | Cis-1,4 Content (percent) | 1,2 Content (percent) |
|---|---|---|---|---|
| Methyl ethyl ketone | 0.45 | 29 | 88 | 3.6 |
| Acetophenone | 0.45 | 68 | 86 | 3.4 |
| Benzaldehyde | 0.45 | 63 | 80 | 4.4 |
| Furfural | 0.60 | 63 | 83 | 3.5 |

The above examples have shown the results obtained with a representative number of polar compounds and these may be readily replaced by other hydroxyl or carbonyl compounds as described herein. Similarly, the aluminum trialkyls used in the examples may be replaced by other such compounds and by aluminum dialkyl halides which are known to those skilled in the art to perform in polymerization as catalysts in a manner similar to aluminum trialkyls.

What is claimed is:

1. The process of producing a polymer of butadiene-1,3 in which at least 80% of the units are in the cis-1,4 configuration which comprises polymerizing butadiene-1,3 in the presence of a catalyst system formed by admixing (1) titanium trichloromonoiodide, (2) an organoaluminum compound corresponding to the general formula AlR'R''R''' in which R' and R'' represent hydrocarbon radicals and R''' represents a radical selected from the group consisting of halogen atoms and hydrocarbon radicals, and (3) a polar hydrocarbon soluble compound selected from the group consisting of aldehydes having from 1-8 carbon atoms and ketones having from 3-12 carbon atoms, the molar ratio of (2) to (1) being between about 1:1 and 3:1 and the molar ratio of (3) to (1) being between 0.1:1 and 0.6:1.

2. The process of producing a polymer of butadiene-1,3 in which at least 80% of the units are in the cis-1,4 configuration which comprises polymerizing butadiene 1,3 while dispersed in a non-reactive liquid medium at a temperature of about 0° C., to about 50° C., and in the presence of a catalyst formed by admixing (1) titanium trichloromonoiodide, (2) an aluminum tri-alkyl in which each alkyl radical contains from 2-6 carbon atoms, and (3) a polar hydrocarbon soluble compound selected from the group consisting of aldehydes containing 1-8 carbon atoms and ketones containing 3-12 carbon atoms, the molar ratio of the proportion of said aluminum trialkyl to the proportion of said titanium trichloromonoiodide being between about 1:1 and 3:1 and the molar ratio of the proportion of said polar hydrocarbon soluble compound to the proportion of said aluminum trialkyl being between 0.1:1 to 0.6:1.

3. The process according to claim 2, in which said butadiene-1,3 dispersed in a non-reactive liquid medium comprising predominately an aromatic hydrocarbon.

4. The process according to claim 3 wherein the aromatic hydrocarbon is benzene.

5. The process according to claim 3 in which the polar, hydrocarbon-soluble compound is an aldehyde containing 1-8 carbon atoms.

6. The process according to claim 3 wherein the polar, hydrocarbon-soluble compound is a ketone containing 3-12 carbon atoms.

References Cited

UNITED STATES PATENTS

| | | | |
|---|---|---|---|
| 2,881,156 | 4/1959 | Pilar et al. | 260—94.3 |
| 2,965,626 | 12/1960 | Pilar et al. | 260—94.3 |
| 2,965,627 | 12/1960 | Field et al. | 260—94.3 |
| 3,099,648 | 7/1963 | Dye | 260—94.3 |
| 3,116,272 | 12/1963 | Stewart et al. | 260—94.3 |
| 3,116,274 | 12/1963 | Boehm et al. | 260—94.3 |
| 3,196,143 | 7/1965 | Stewart et al. | 260—94.3 |

FOREIGN PATENTS

| | | |
|---|---|---|
| 598,453 | 6/1961 | Belgium. |
| 664,389 | 6/1963 | Canada. |
| 865,337 | 4/1961 | Great Britain. |
| 1,259,291 | 3/1961 | France. |

JOSEPH L. SCHOFER, *Primary Examiner.*

R. BENJAMIN, E. J. SMITH, *Assistant Examiners.*